United States Patent
Wu

(10) Patent No.: US 10,270,587 B1
(45) Date of Patent: Apr. 23, 2019

(54) METHODS AND SYSTEMS FOR ELECTRONIC TRANSACTIONS USING MULTIFACTOR AUTHENTICATION

(75) Inventor: Frank L. Wu, Wayne, NJ (US)

(73) Assignee: CITIGROUP TECHNOLOGY, INC., Weehawken, NJ (US)

( * ) Notice: Subject to any disclaimer, the term of this patent is extended or adjusted under 35 U.S.C. 154(b) by 972 days.

(21) Appl. No.: 13/470,945

(22) Filed: May 14, 2012

(51) Int. Cl.
*H04L 9/00* (2006.01)

(52) U.S. Cl.
CPC ......... *H04L 9/008* (2013.01); *G06Q 2220/00* (2013.01)

(58) Field of Classification Search
CPC .......................................................... H04L 9/00
USPC .............. 705/26.1, 39–44, 64–79, 50; 726/9, 726/16–21; 235/379–383
See application file for complete search history.

(56) References Cited

U.S. PATENT DOCUMENTS

| | | | | |
|---|---|---|---|---|
| 5,590,197 | A * | 12/1996 | Chen et al. ...................... | 705/65 |
| 5,884,289 | A * | 3/1999 | Anderson et al. .............. | 705/44 |
| 6,327,578 | B1 * | 12/2001 | Linehan ................. | G06Q 20/02 705/65 |
| 6,434,403 | B1 * | 8/2002 | Ausems et al. ............. | 455/556.2 |
| 7,806,322 | B2 * | 10/2010 | Brundage et al. ............. | 235/380 |
| 8,473,748 | B2 * | 6/2013 | Sampas ......................... | 713/186 |
| 2003/0061171 | A1 * | 3/2003 | Gilbert ................... | G06Q 20/02 705/65 |
| 2006/0206709 | A1 * | 9/2006 | Labrou et al. ................ | 713/167 |
| 2007/0198432 | A1 * | 8/2007 | Pitroda .................. | G06Q 20/02 705/64 |
| 2008/0040265 | A1 * | 2/2008 | Rackley, III et al. .......... | 705/40 |
| 2008/0301464 | A1 * | 12/2008 | Parkinson ............. | H04L 9/3247 713/186 |
| 2010/0145854 | A1 * | 6/2010 | Messerges et al. ............. | 705/44 |
| 2012/0072714 | A1 * | 3/2012 | Grandcolas .......... | H04L 9/0825 713/155 |
| 2012/0143770 | A1 * | 6/2012 | Pauker et al. ................... | 705/71 |
| 2012/0310720 | A1 * | 12/2012 | Balsan ................... | G06Q 20/02 705/65 |

OTHER PUBLICATIONS

Caggiani, E., "Withdraw Cash from an ATM by Scanning a QR Code with Your Phone," http://www.talkandroid.com/117051-withdraw-cash-from-an-atm-by-scanning-a-qr-code-with-your-phone/ , Jun. 16, 2012, 4 pages.

* cited by examiner

*Primary Examiner* — James D Nigh
*Assistant Examiner* — Isidora I Immanuel
(74) *Attorney, Agent, or Firm* — Johnson, Marcou & Isaacs, LLC; John M. Harrington, Esq.

(57) ABSTRACT

Methods and systems for performing electronic transactions involve receiving, using a processor coupled to memory, from a mobile application on a user's mobile device processor, a transaction message consisting at least in part of the user's account information obtained by the mobile application reading user account information encoded on a token of the user that is physically distinct from the mobile device processor and a transaction request for the user. Using the processor, the user's account information is verified and a transaction confirmation message is generated and sent to the mobile application on the user's mobile device processor.

31 Claims, 14 Drawing Sheets

METHODS AND SYSTEMS FOR ELECTRONIC TRANSACTIONS USING MULTIFACTOR AUTHENTICATION

FIELD OF THE INVENTION

The present invention relates generally to the field of electronic transactions, and more particularly to methods and systems for performing electronic transactions using multifactor authentication.

BACKGROUND OF THE INVENTION

Currently, an increasing rate of fraud in Automated Teller Machine (ATM) and credit card transactions, including online transactions, and online banking authentication issues, are significant concerns in electronic consumer transactions. Previous attempts at resolving some of the existing issues offer a solution in only one segment, while failing to address issues in other segments. For example, one such attempt employs token-based user authentication, which requires additional issuance and administration of a hardware security token. Such security tokens are bulky, which makes it inconvenient for users to carry more than a few of the security tokens. Another such attempt relies on Short Message Service (SMS) messages to a mobile device, which may be subject to an SMS attack, and SMS messages are slow and not always reliable.

Other attempts rely, for example, solely on mobile devices for user authentication in mobile banking transactions. A further attempt provides credit card image recognition to read credit card account numbers and proof of the user owning the credit card, which has an inherent weakness of being unable to verify that the credit card is real. Additional attempts employ Near Field Communication (NFC) in transactions, but NFC does not resolve user authentication and backend banking security issues. Still other attempts involve storing credit card information on a mobile device as a personal cash management tool, which does not effectively address the issue of user authentication to the mobile device, and the person who possesses the phone also possesses the maximum value of the credit limit and therefore the risk is not well contained.

There is a present need for a solution that resolves all of the foregoing issues in an end-to-end approach for providing, for example, a multifactor user authentication that is natural and convenient to a user, while providing much higher authentication security than is currently available.

SUMMARY OF THE INVENTION

Embodiments of the invention employ computer hardware and software, including, without limitation, one or more processors coupled to memory and non-transitory computer-readable storage media with one or more executable computer application programs stored thereon which instruct the processors to perform the methods and systems for generating customer incentives described herein. It is to be understood that the term "processor" as used herein, either standing alone or in combination, refers to a computer processor. It is to be further understood that the term "application" as used herein, either standing alone or in combination, refers to a computer application executing or executable on a processor coupled to memory.

In aspects, embodiments of the invention propose methods and systems for performing electronic transactions using multifactor authentications that involve, for example, receiving, using a processor coupled to memory, from a mobile application on a user's mobile device processor, a transaction message consisting at least in part of the user's account information obtained by the mobile application reading user account information encoded on a token of the user that is physically distinct from the mobile device processor and a transaction request for the user. Using the processor, the user's account information is verified and a transaction confirmation message is generated and sent to the mobile application on the user's mobile device processor.

In other aspects of embodiments of the invention, receiving the transaction message may involve receiving a self-service financial transaction terminal transaction request message. In a further aspects, receiving the self-service financial transaction terminal transaction request message may involve receiving an automated teller machine withdrawal transaction request message. In additional aspects, receiving the transaction message may involve receiving a payment transaction request message. In still further aspects, receiving the payment transaction request message may involve receiving a merchant identifier and a payment amount for the payment transaction request. In still other aspects, receiving the payment transaction message may involve receiving an online payment transaction request message. In further aspects, receiving the transaction message may involve receiving an electronic wallet fill request transaction message.

In additional aspects of embodiments of the invention, receiving the transaction message may involve receiving a fund transfer transaction request message. In other aspects, receiving the fund transfer transaction request message may involve receiving a fund transfer amount for the fund transfer transaction. In further aspects, receiving the fund transfer transaction request message many involve receiving a fund transfer receiver identifier for the fund transfer transaction. In still other aspects, receiving the transaction message may involve receiving the transaction message from the mobile application on the mobile device processor via a self-service financial transaction terminal. In still further aspects, receiving the transaction message may involve receiving the transaction message from the mobile application on the mobile device processor via a point-of-sale (POS) device.

In further aspects of embodiments of the invention, receiving the transaction message consisting at least in part of the user account information obtained by the mobile application reading the user account information may involve receiving the transaction message consisting at least in part of the user account information obtained by the mobile application reading the user account information encoded with high-density, two-dimensional code from the token of the user. In other aspects, receiving the transaction message consisting at least in part of the user account information obtained by the mobile application reading the user account information may involve receiving the transaction message consisting at least in part of the user account information obtained by the mobile application reading the user account information encoded with matrix bar code from the token of the user. In additional aspects, receiving the transaction message consisting at least in part of the user account information obtained by the mobile application reading the user account information may involve receiving the transaction message consisting at least in part of the user account information obtained by the mobile application reading the user account information encoded on a transaction card of the user.

In still further aspects of embodiments of the invention, receiving the transaction message may involve receiving the transaction message consisting at least in part of a user identifier. In other aspects, receiving the transaction message consisting at least in part of the user identifier may involve receiving the transaction message consisting at least in part of the user's personal identification number (PIN). In additional aspects, receiving the transaction message consisting at least in part of the user identifier may involve receiving the transaction message consisting at least in part of a user's electronic wallet personal identification number (PIN). In further aspects, receiving the transaction message may involve receiving the transaction message consisting at least in part of a mobile device identifier. In still other aspects, receiving the transaction message consisting at least in part of the mobile device identifier may involve receiving the transaction message consisting at least in part of an International Mobile Subscriber Identity (IMSI) designation for the mobile device.

In additional aspects of embodiments of the invention, receiving the transaction message may involve receiving the transaction message encrypted by the mobile application with a public key of the card issuer. Other aspects may involve decrypting, using the processor, the encrypted transaction message with the card issuer's private key of a public/private key pair of the card issuer. In further aspects, verifying the user's account information may involve checking the user's account balance, decrementing the user's account by a transaction request amount, and updating a user's account record. In other aspects, updating the user's account record may involve updating electronic wallet account records for both a sender and a receiver in a fund transfer transaction.

In further aspects of embodiments of the invention, generating the transaction confirmation message may involve generating a two part transaction authorization message having a first part consisting at least in part of instructions to a self-service financial transaction terminal and a second part consisting at least in part of account balance information to the mobile application. In other aspects, generating the transaction confirmation message may involve generating an authorization code to a merchant's point-of-sale (POS) device and a confirmation number to the mobile application. In additional aspects, generating the transaction confirmation message may involve generating a confirmation message consisting at least in part of a transaction amount and a confirmation code. In still other aspects, generating the transaction confirmation message may involve generating an authorization code consisting at least in part of a combination of a card issuer's identifier and a transaction identifier. In still further aspects, generating the transaction confirmation message may involve generating a transaction confirmation code and an account balance. In additional aspects, sending the transaction confirmation message to the mobile application may involve sending an at least partially encrypted transaction confirmation message to the mobile application.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
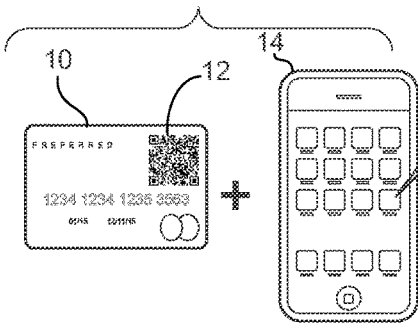
FIG. 1 is a schematic diagram that illustrates an example of the key components and the relationship between key components for very strong authentication according to embodiments of the invention.
Figure 1:
Figure 1:
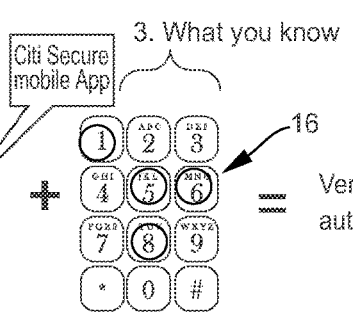

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention provide strong authentication using multifactor authentications that enables a series of related electronic consumer transactions including, for example, ATM transactions, online purchase transactions, in-store checkout transactions, electronic wallet transactions, personal fund transfer transactions, and fund collection transactions. Thus, embodiments of the invention provide easy-to-use, very strong end user authentication that establishes a solid foundation for secure transactions and addresses issues, such as economic losses due to the current rate of increase in fraudulent ATM transactions, credit card transactions, online purchasing transactions, and mobile payment transactions. Specifically, embodiments of the invention redefine the security parameters used in authenticating clients, maximize transaction efficiency, and provide an intuitive user experience in financial transactions in general, and in the financial services industry in particular. These benefits translate directly, for example, into a better customer experience and lower operational risks for a financial institution, such as a bank, which generates customer loyalty as well as increased profitability.

It is to be understood that the term "bank" as used herein may refer to any type of financial institution. It is to be further understood that references herein to components, such as "mobile device", "ATM", "POS terminal", "mobile application", "card issuer application", "issuer's application", "banking application" or "merchant's application", or to participants, such as "mobile device", "bank", "card issuer", "financial institution", or "merchant", comprise, without limitation, processors coupled to memory and to other processors likewise coupled to memory via computer networks, as well as computer program products and applications stored in machine readable media and executing in such processors and memory.

The authentication method for embodiments of the invention may use multiple parameters, such as: "what the user has", "what the user knows", "what the user's mobile application knows", and "What the bank knows". The "what the user has" parameter may involve, for example, an ATM card or a credit card imprinted or embedded with a high density, two-dimensional code which contains encrypted account information for the user. The "what the user has" parameter may also involve a mobile device with an identifier, such as the International Mobile Subscriber identity (IMSI) registered, for example, to the bank's system. The "what the user has" parameter may further involve, for example, the phone number of the user's mobile device. Finally, the "what the user knows" parameter may involve, for example, an ATM or credit card Personal Identification Number (PIN) code that has been established, with the bank.

FIG. 1 is a schematic diagram that illustrates an example of the key components and the relationship between key components for very strong authentication according to embodiments of the invention. Referring to FIG. 1, as noted above, what the user has may include, for example, the cardholder's ATM or credit card 10 with QR code 12 imprinted on the card that contains the cardholder's card account number. There are many high-density codes, one of which is QR code, hut other examples of high-density code include, without limitation, Maxicode, MS Tag (HCCB), and Touchcode available from Printechnology. What the user has also includes, for example, a mobile device 14 with a financial institution's secure mobile application with encryption unique to each QR code, plus the IMSI number and phone number for the mobile device. What the user and the bank both know is the cardholder's PIN code 16.

The high density, two-dimensional code employed in embodiments of the invention may comprise QR code. However, it is to be understood that any other two-dimensional, high density code or bar code may be used in embodiments of the invention. The two-dimensional high density code may be imprinted on the card or, for example, embedded in a Radio-Frequency Identification (RFID)-capable card, such as a plastic card, or invisibly printed on the card using a process such as the Touchcode technology. The code that is imprinted on the card or embedded in the card may contain, for example, a cardholder's account information which is encrypted with a key that is assigned by a card issuer, such as the bank. It is to be understood that embodiments of the invention are not limited to ATM cards or credit cards but may include any type of transaction card and that references to "card" or "ATM card" or "credit card" herein comprise any and all types of transaction cards.

In embodiments of the invention, communications between the mobile application on the cardholder's mobile device, such as a mobile phone, and a bank-issuer's authentication processor may utilize matching public/private key pairs. A message from the card issuer's application may be encrypted with the public key that the mobile application submitted during activation and hence this is the "what the mobile application knows" parameter. Likewise, a message from the mobile application to the card issuer's application may be encrypted by the card issuer's public key. Therefore, only the card issuer's banking application has the ability to decrypt the message from the mobile application. This is the "what the bank knows" parameter, since only the card issuing institute has the ability to read the account content.

The foregoing combination for embodiments of the invention forms a very strong set of security parameters for authenticating a person to the bank. Additionally, embodiments of the invention offer the same level of user actions that are presently available to users with the currently employed insecure models. QR code may be selected for embodiments of the invention at least in part because of its maturity, low cost of production, resilience to errors caused by physical damage, and broad availability of the technology. However, as noted above, embodiments of the invention are not limited to QR code, and any other high-density code may be used as well.

In embodiments of the invention, the QR code imprinted or embedded on an ATM or credit card implementation may consist of two parts of information. One of such information parts may be for confidential information encrypted by the card issuer application. The encryption key for such confidential information may be assigned by the card issuer uniquely for each client. Hence the confidential information may only be decrypted by a specially made, properly activated mobile application. The encryption key along with its identifier may be stored in the mobile application during registration of the user's card with the issuer. The other of such information parts may be for non-confidential information which is required for the mobile application to process the encrypted block. The other information part may also contain other non-confidential information for the mobile application to provide assistance to the user, such as an account representative contact number.

More specifically, the part one information may be the secured block of information, which may contain, for example, the user's account number and the issuer's URL address to which the mobile application may forward the user's account number. The free text field may use ";" as a field delimiter, or it may use some other data structure. For example, part one may contain the following information:
1092837465102938; verify.topbank.com; Salt, padding, discretional data or information where "1092837465102938" is the card holder's account number. "verify.topbank.com" is the address to which the mobile application may authenticate the card holder, and "Salt, padding, discretional data or information" may contain such miscellaneous information as the card issuer desires. The above information may be encrypted with 128 bits, using an AES algorithm, and Base-64 encoding to generate text string, the output of which may be:

31a4k2MLBXoNlkzNLI8zVUUwXtD5AOg4bitGO
   AKuvF7hKT4hOuN6YkOdB8tWBZZ61YfWyR
   G0Nv1LdDOp9S19Qfv9nqPtP9MtNXJv1U7Hn/
   5WHGb13HJu AACdzrydbj19

Because each account is encrypted with a unique encryption key that is generated by the issuer, the part two information may be necessary for the mobile application to locate the assigned symmetric encryption key to unveil the user's account number. The key may be stored in the key store of the mobile application once successfully activated.

The part two information is the plain text block that may contain, for example, the encryption key identifier and the issuer's support Uniform Resource Locator (URL), and phone number. The plain text block may use ";" as a field delimiter. Below is an example of part two information content:

A7T49S31;www.topbank.com;987-654-3210 where the first field, A7T49S31, is a symmetric encryption key identifier and the second and third fields are the issuer's support URL and phone number, respectively. The part two information may not be necessary for the implementation of embodiments of the invention but is shown to illustrate how additional information may be included for users' convenience. Alternatively, the part two information may be printed, for example, on the back of the card. However, it may be more convenient for the user if the part two information is integrated into the QR code, so that the mobile application may be able to make a call or connect to a support site when the user needs support.

Figure 2:
FIGS. 2-4 illustrate examples of three different outputs with different sizes of QR code data content for embodiments of the invention.
Figure 3:
Figure 4:
Figure 5:
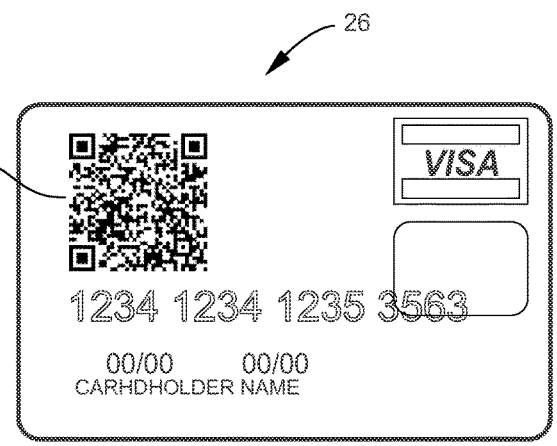
FIG. 5 shows an example of an ATM card or credit card with QR code applied.

It is to be noted that QR code size may vary according to data size, level of error correction, and module size. FIGS. 2-4 illustrate examples of three different outputs with different sizes of QR code data content for embodiments of the invention. For example, the QR code 20 shown in FIG. 2 contains a 16 digit account number in text format; random data fields of 68 characters: 128 bits Advanced Encryption Standard (AES) encrypted, base 64 encoded; a key identifier; the issuer's URL; and the issuer's telephone number. For another example the QR code 22 shown in FIG. 3 contains a 16 digit account number in text format; random data fields of 68 characters; 128 bits AES encrypted, base 64 encoded; a key identifier; and the issuer's URL. For a further example, the QR code 24 shown in FIG. 4 contains a 13 digit account number in text format; random data fields of 19 characters; 128 bits AES encrypted, base 64 encoded; a key identifier; and the issuer's URL. FIG. 5 shows an example of an ATM card or credit card 26 with QR code 28 applied.

As previously noted, it is to be understood that references herein to components or participants include, without limitation, processors coupled to memory and to other processors likewise coupled to memory via computer networks, as well as computer program products and applications stored in machine readable media and executing in such processors and memory. It is to be further understood that the processes presented herein as sequences of steps in the flow charts and diagrams hereof may be rendered for parallel execution or into different sequences of steps.

The mobile application for embodiments of the invention may be a common, PKI-enabled platform that serves different cards and works seamlessly with multiple banking applications on the backend. Therefore, each card may have a unique account number encrypted on it by a unique symmetric key with a corresponding unique identifier assigned by the card issuer. In embodiments of the invention, all symmetric encryption keys that are successfully activated may be stored in the mobile device's local memory. Such storage does not present a security threat because the QR code is external to the mobile device.

According to embodiments of the invention, the mobile application may read the encrypted block and use the encryption key identifier to locate the proper decryption key to decrypt the part one information of the QR code to unveil the account or card number and the URL used for authentication. The mobile application for embodiments of the invention may support various card issuers using the same technology and may share the same protocols. The mobile application for embodiments of the invention may be downloaded and installed from the card issuer's site by the mobile device owner. Alternatively, the mobile device owner may obtain assistance from any affiliated bank branch offices.

Once the mobile application for embodiments of the invention is installed on the owner's mobile device, the card owner, who may also be the mobile device owner, may activate the mobile application. Once the mobile application is activated, a banking application of the card issuer may perform a number of functions. For example, the banking application may create a digital certificate and register it to the card issuer's authentication system. The digital certificate may assure the security of the future communications between the mobile application and the card issuer using public key cryptographic technology.

The banking application for embodiments of the invention may receive and store the symmetric key from the card issuer that is unique to the owner's card. In addition, the banking application may register the user's PIN to the card issuer's authentication server. Further, the banking application may allow the card issuer's authentication server to associate the card account number, the user's PIN, the user's mobile device identifier or IMSI number, the user's mobile phone number, the user's name, and user's public key corresponding to the user's private key.

The banking application for embodiments of the invention may also establish an automatic key-disable period of non-use of the mobile application, after which the encryption key is automatically disabled. Additionally, the banking application may optionally create an electronic wallet so that the user is not required to rely on an ATM card or credit card for relatively small cash payments. Finally, the banking application may generate a local encryption key from the unique fingerprint of the owner's mobile device, which may be used to protect the PIN for the electronic wallet and the symmetric key store.

In embodiments of the invention, the user may register multiple mobile devices and mobile applications to the same card. Further, the mobile application may have a key-wipe function when the mobile application has reached a predefined interval of inactivity, which key may be reestablished should the user decide to resume the usage of the mobile application. However, if a mobile device is reported lost, the card issuer may be required to issue a new card with a new symmetric encryption key. In that case, a new card number may optionally be issued to the cardholder to assure that the encryption keys in the mobile application are no longer valid. If a new card number is issued to the cardholder, the cardholder may be required to repeat the activation process.

In embodiments of the invention, the same public key and private key pair owned by the mobile application may be shared with multiple card issuers. That is possible because only the public key of the mobile application may be stored on the card issuer's authentication server, and it may be used only to encrypt response messages from the card issuer's application to the mobile application. Conversely, the mobile application may store the card issuer's public key at the local storage of the mobile application, associate the card issuer's public key with the card issuer's URL, and use the card issuer's public key when the mobile application sends a request or message to the card issuer's application. The mobile application may also store the unique symmetric key corresponding to each card, which is identified in the QR code on the card.

ATM cards or credit cards imprinted with QR code may be compatible with existing systems and devices that read account information from a magnetic stripe on a transaction card, such as an ATM card or a credit card. Such cards may likewise be used for performing transactions over the phone in the traditional way and may also be compatible with traditional client support activity over the phone in which a client, for example, reads the card number to a client support person. While these existing systems, devices and traditional methods are not as secure as embodiments of the invention, such compatibility may assure a smooth migration or integration as such embodiments become the ubiquitous transaction method. During such migration or integration, a certain level of risk may remain when a user employs a traditional transaction mechanism, but once the QR code for embodiments of the invention becomes ubiquitous, there may no longer be any reason to have a magnetic strip on a card, and the card itself may only need to contain a minimum amount of human-readable information.

Figure 6:
FIG. 6 illustrates an example of a future QR-imprinted or QR-embedded credit card or ATM card for embodiments of the invention.

Ultimately, according to embodiments of the invention, ATM cards and credit cards imprinted with QR code may be reduced to the size of a typical membership tag or fob that can be carried on a key chain. Because the confidential information contained in the QR code may be decrypted only by the mobile application and may be accepted only after all authentication factors are correct, physical security concerns regarding the ATM card or credit card itself are diminished or virtually eliminated. FIG. 6 illustrates an example of a future credit card or ATM card 28 imprinted or embedded with QR code 30 for embodiments of the invention.

As is known in the art, NFC is a contactless, very short distance, low energy, wireless method of communication. NFC communication is extremely simple to set up and pairing of devices is not required for communication between devices. A typical communication distance between NFC-enabled devices may be less than 4 cm, and NFC may support transmission data rates of 106 K-bits/second, 212 K-bits/second, and 424 K-bits/second. Such transmission rates may be sufficient for the mobile application for embodiments of the invention because the data size used is very small, typically in the hundred bytes range. NFC-enabled mobile devices are popular in Japan and Western Europe, and most mobile device providers in the United States now offer NFC-enabled mobile devices.

An aspect of embodiments of the invention may enable use of a mobile device as a payment vehicle. In such aspect, the mobile device may not store credit card or payment card information, but the card issuer may be able to verify and confirm that payment is authorized by the user using strong authentication for embodiments of the invention. A point-of-sale (POS) device with Internet connectivity may function as a relay station between the mobile device, the card issuer's application, and a merchant acquiring bank. The POS relay device may also be a portable wireless unit in a service environment, such as a restaurant, so that the mobile owner may not be required to hand his or her mobile device, for example, to a server and allow the mobile device to be removed from the owner's immediate presence.

Since the communication messages for embodiments of the invention is encrypted between the mobile device and the issuer's application, the POS device may function only as a message forwarder in both directions. Thus, the security concerns of eavesdropping or intercepted messages may be eliminated. In this aspect, the default operation mode of the user's mobile device may be as an electronic wallet, in which mode the owner's mobile device may hold a limited amount of cash value for easy, convenient payment processing. Since there is no credit card or ATM card information stored on the owner's mobile device in such aspect, any financial impact due to loss of the mobile device and PIN code together is limited to the remaining balance on the electronic wallet. Additionally, the card issuer bank may have the capability to disable the owner's electronic wallet function if the owner's mobile device is reported lost or stolen.

The IMSI of a mobile device is a unique identification associated with all Global System for Mobile communication (GSM) and Universal Mobile Telecommunications Systems (UMTS) network mobile phone users. It may be stored as a 64-bit field, for example, on the Subscriber Identity Module (SIM) card inside the mobile phone, and it associates the mobile phone to the carrier network. In embodiments of the invention, each user may be required to have a user-assigned PIN containing, for example, from four to six digits. The greater the number of digits, the less acceptable to a user. However, a 6-digit PIN code is not strong at all in today's environment. Therefore, merely relying on the PIN code provides very weak security, especially when the PIN is stored on the mobile device. Another solution may rely on a user-entered password. While a user-entered password may offer a relatively stronger degree of security, entering such as password may prove difficult for may users due to the small keypad space.

Embodiments of the invention may require a user to enter a PIN associated with each ATM or credit card, which may be stored in the card issuer's authentication data store and not on the mobile device. Further, the PIN associated with an ATM or credit card is independent from the PIN code that a user may set up to operate one's mobile device. Therefore, it is to be understood that references to "PIN" or "PIN code" herein refer to a PIN associated, for example, with the ATM or credit card of a user rather than a PIN intended, for example, merely to unlock the user's mobile device.

In embodiments of the invention, the PIN code for an ATM or credit card, along with the account number, the mobile number, the IMSI number for the mobile device, and a command forming a service request payload may be encrypted by the mobile application with the card issuer's public key before transmitting. Therefore, the payload may be decrypted only by the card issuer to read the account number, the mobile number, the IMSI number, the PIN code, and the service request.

As previously noted, embodiments of the invention employ four security elements, the details and complexity of which are completely transparent to a user. The first such element may be QR code on the card, which comprises "what the user has" and "what the user knows" elements. Because the QR code may be read only by the mobile application using the decryption key that the was assigned by the issuer, the security gap arising from lost property is closed. Embodiments of the invention effectively prevent a situation, such as a fraudster using a hidden camera to photograph both a user's QR code image and PIN code at the same time, because the QR code is encrypted with an assigned encryption key that is stored on the mobile application after activation.

Other such elements include the mobile number and the mobile device IMSI number, which are associated by the issuer during the account activation process and which also comprise "what the user has" and "what the user knows" elements. The PIN code, which the issuer associates with the user's card and securely stores during activation and which is never stored on the mobile application, likewise comprises the "what the user knows" element.

Each transaction message may be encrypted with the public key of the user's cryptographic key pair before transmitting by the issuer's banking application to the user's mobile application. Likewise, each transaction message may be encrypted with the public key of the issuer's cryptographic key pair before transmitting by the user's mobile application to the issuer's application. This approach assures message security to prevent, for example, eavesdropping, man-in-the-middle attacks, data modification attacks, and message replay attacks, since the response to such transaction messages can be decrypted only by the specific mobile user's application.

The mobile application for embodiments of the invention may have a number of features including, for example, NFC enablement; a capability to scan and read QR code, parse off an encrypted data block, and then the clear data block; and capabilities to generate cryptographic key pairs, construct certificate signing request messages, and manage multiple symmetric keys. In addition, the mobile application for embodiments of the invention may support use cases of multiple cards from the same card issuer, multiple cards from different card issuers, and the use of one mobile application with many different cards.

The mobile application for embodiments of the invention enforces user PIN code entry and may not allow a transaction to commence unless the correct PIN code is entered. The mobile application may also serve as a common platform to support multiple transaction types, such as ATM withdrawal, POS transactions in which a card is presented, electronic wallet setup, small value transactions with the electronic wallet, fund transfers between electronic wallets, and check deposits by telephone. Further, the mobile application for embodiments of the invention may act as a front end unit that provides a user interface for the mobile user and interacts with back-end applications, with an adaptive capability that arranges the most frequently used menu items at the top of a menu based on the user's operation history.

As previously noted, in embodiments of the invention, the PIN codes for ATM cards and credit cards are not stored on the mobile device. However, the PIN code for the electronic wallet may be stored on the mobile device. The mobile application for embodiments of the invention may also support, for example, mobile SIM card replacement functions; mobile device replacement functions; a single cardholder with multiple mobile devices; mobile electronic wallet functions; and customizable menu list functions.

The mobile application for embodiments of the invention may store a pre-established electronic wallet account number in local memory of the mobile device. Any security risk may be confined to the maximum cash value that is allowed to be held in the electronic wallet which may, as a practical matter, typically be limited to a small amount. When setting up his or her electronic wallet, a user may receive a unique electronic wallet identifier (ID) that may be assigned by the card issuer. The user may preload the electronic wallet with a specified amount of cash value after successfully authenticating to the card issuer. If the preloaded cash source is an ATM account, the user may be authenticated with an ATM card using an ATM PIN and the mobile application for embodiments of the invention. Alternatively, the cash source for the electronic wallet may be a pre-allocation of a credit line. If so, the user may authenticate with a credit card using a card PIN and the mobile application. The electronic wallet for embodiments of the invention may require a separate PIN to release funds. When approaching an NFC-enabled POS device, the user may simply launch the user's mobile application, select a mobile payment menu, enter the user's PIN, and place the user's mobile device next to the NFC transponder of the POS device.

A card owner may also use the electronic wallet for embodiments of the invention in an online purchase. If a merchant also has an electronic wallet account, a transaction between the user and the merchant may be as simple as a transfer of funds from the user's electronic wallet to the merchant's electronic wallet. If the merchant does not have an electronic wallet account, the merchant may be required, for example, to generate a QR code that contains a transaction amount and a merchant identifier. The user may then use his or her mobile application to scan the merchant-generated QR code, whereupon the mobile application may assemble the scanned QR code into a transaction request message and send the message to the card issuer. If the card issuer confirms that the user has sufficient funds for the transaction, the card issuer may provide an authorization code to the user which contains a card issuer ID and an approval number, and which the user may enter on an online screen for the merchant. Upon receipt of the authorization code, the merchant may confirm the authorization with the card issuer. The transaction is thus confirmed by multiple parties and hence secure and undeniable.

Embodiments of the invention may employ a number of different methods for initial identity binding. In one scenario, a cardholder may receive a QR code-imprinted card by postal service delivery and an activation code by a separate postal service delivery. In another scenario, the cardholder may receive a QR code-imprinted card without also receiving an activation code while having a current mobile number that is different from the mobile number on record with the card issuer. In such case, the cardholder may proceed to any affiliated bank branch office to prove the cardholder's identity and activate the card, for example, via a terminal installed in the branch office.

In a further scenario, the cardholder may receive a QR code-imprinted card without also receiving an activation code while having a current mobile number that is the same as the mobile number on record with the card issuer. It is to be noted that the same cardholder may request registration of additional mobile devices to use with the same cards, and each registration may require a unique activation code in a similar process. The unique encryption key may be updated on renewal of the card, and the same process may be repeated.

The mobile application for embodiments of the invention may require the mobile device to associate with the cardholder's ATM or credit cards. Key processes for embodiments of the invention may involve, for example, initial registration of the mobile application; initial association of the cardholder's cards to the owner; card replacement;

mobile device replacement; card suspension or account termination; and mobile account suspension or termination. Key attributes for embodiments of the invention may include, for example, use of the same PIN for a cardholder's ATM card and electronic wallet, and each secure store corresponding to one ATM card.

The mobile application for embodiments of the invention may have a basic menu of activities for the owner of the mobile device to select banking activities which the owner wants to conduct. In addition, the application may have adaptive capabilities to learn, or to retain, the last "n" number of types of activities conducted by the client. Using the owner's mobile device may assure that the owner's mobile phone number and IMSI number match up to the owner's bank account and ATM PIN, which makes the authentication process for embodiments of the invention equal to or better than any currently available security measure. Embodiments of the invention provide a secure foundation for mobile banking and online transactions. Use of the process and message flows for embodiments of the invention assures the soundness of online transactions without increasing the burden to users and offers substantial protection to users, card issuers and merchants.

Figure 7:
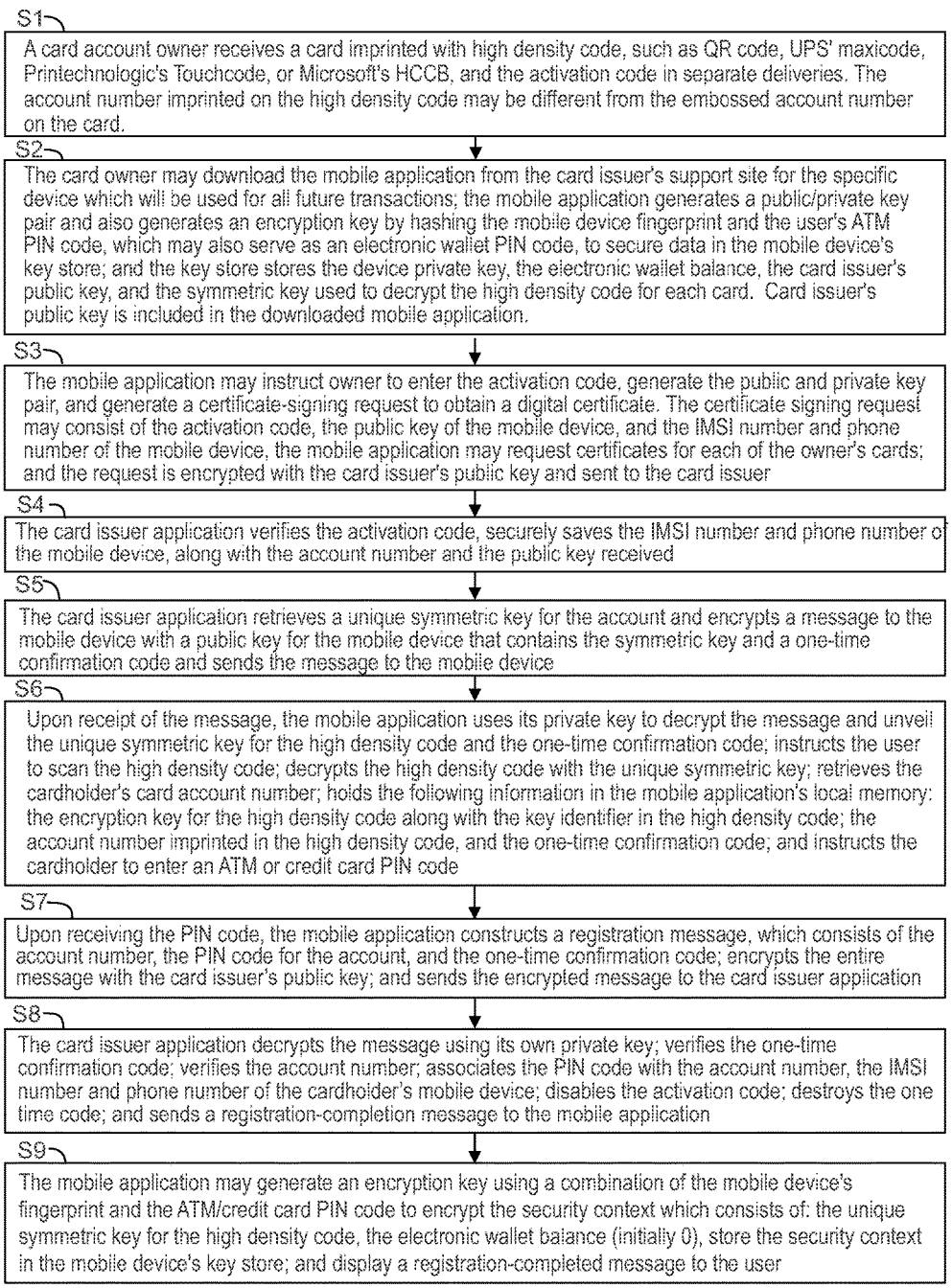
FIG. 7 is a flow chart that illustrates an example of the account activation and card registration process for embodiments of the invention.

FIG. 7 is a flow chart that illustrates an example of the account activation and card registration process for embodiments of the invention. Referring to FIG. 7, at S1, a card account owner may receive a QR code-imprinted card and the activation code in separate deliveries, such as postal service deliveries and not via online or email. At S2, if the card owner's mobile device does not have the mobile application installed, the card owner may download the mobile application, for example, from the card issuer's support site for the specific device which may be used for all future transactions; the mobile application generates a public/private key pair and also generates an encryption key by hashing the mobile device fingerprint and the user's ATM PIN code, which may also serve as an electronic wallet PIN code, to protect the secure store; and the key store stores the device private key, the electronic wallet balance, the card issuer's public key, and the symmetric key used to decrypt the QR code for each card.

Referring further to FIG. 7, at S3, the mobile application may use the private key of the mobile device to generate a certificate-signing request to obtain a digital certificate, which may consist of an activation code that was delivered to the card owner either by postal service or online, the public key of the mobile device, and the IMSI number and phone number of the mobile device, from the card issuer, or if the mobile device is new or if the mobile device owner wants to renew all certificates, the mobile application may request certificates for each of the owner's cards; and the request is sent to the card issuer. At S4, the card issuer application may verify the activation key, securely save the IMSI number and phone number of the mobile device, along with the account number and the public key received, in a database of the card issuer.

Referring again to FIG. 7, at S5, the card issuer application may retrieve a unique symmetric key for the account and encrypt a message to the mobile device with a public key for the mobile device that contains the symmetric key and a one-time confirmation code and sends the message to the mobile device. At S6, Upon receipt of the message, the mobile application may use its private key to decrypt message and unveil the unique symmetric key for the high density code and the one-time confirmation code. The mobile application may instruct the user to scan the high density code, decrypt the high density code with the unique symmetric key, and retrieve the cardholder's card account number. The mobile application may hold the following information in mobile application's local memory: the encryption key for the high density code along with the key identifier in the high density code, the account number imprinted in the high density code, and one-time confirmation code. The mobile application may instruct the cardholder to enter an ATM or credit card PIN code Referring once more to FIG. 7, at S7, upon receiving the PIN code, the mobile application may construct a registration message, which consists of the account number, the PIN code for the account, and the one time confirmation code; encrypt the entire message with the card issuer's public key; and send the encrypted message to the card issuer application. At S8, the card issuer application may decrypt the message using its own private key; verify the one time confirmation code; verify the account number; associate the PIN code with the account number, the IMSI number and phone number of the cardholder's mobile device; disable the activation code; destroy the one time code; and send a registration completion message to the mobile application. At S9, The mobile application may generate an encryption key using a combination of the mobile device's finger print and the ATM/credit card PIN code to encrypt the security context, which may consist of the unique symmetric key for the high density code and the electronic wallet balance (initially 0), and store the security context in the mobile device's key store and display a registration-completed message to the user. Periodically, the card issuer application may perform account status review; identify any outstanding incomplete activities; instruct account support personnel to contact the cardholder to resolve any obstacles and complete the activation/registration process.

Figure 8:
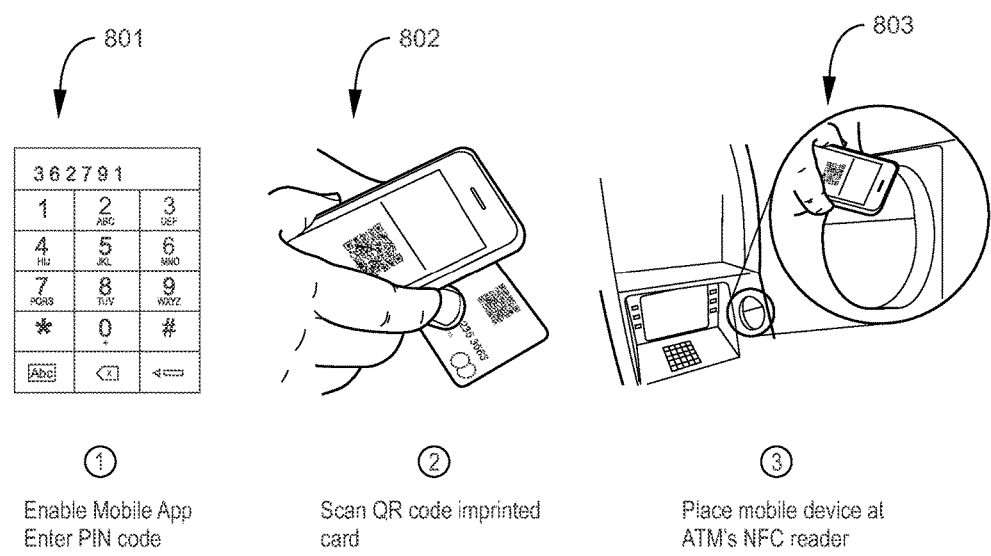
FIG. 8 is a graphic flow chart that illustrates an example of an ATM transaction process for embodiments of the invention.

FIG. 8 is a graphic flow chart that illustrates an example of an ATM transaction process for embodiments of the invention. Referring to FIG. 8, at 801, the cardholder may enable the mobile application on his or her NFC-enabled mobile device and enter his or her PIN code. What the cardholder knows is his or her PIN code; and what the cardholder has is his or her mobile device, with an IMSI number and phone number. At 802, the cardholder may scan the QR code imprinted on his or her card with the cardholder's mobile device. The QR may code contain, for example, the cardholder's encrypted account number, the cardholder's encryption key identifier, and the card issuer's identifier. What the issuer knows is the encryption key. At 803, the cardholder may place his or her NFC-enabled mobile device at the NFC reader of an ATM. It is not necessary for the mobile device to be a smart phone, and the mobile device may have a manufacturer-installed mobile application instead. However, in the present example, the mobile device is NFC-enabled. With the electronic wallet feature, the card holder may enable the mobile application, enter his or her PIN code, and scan the QR code with his or her mobile device at leisure to fill the electronic wallet and then approach an ATM to retrieve cash or perform an online transaction.

Figure 9:
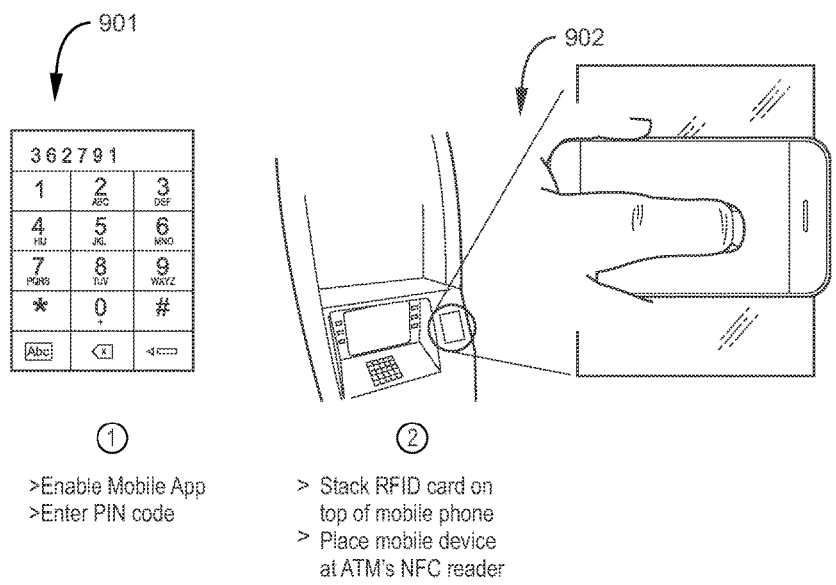
FIG. 9 is a graphic flow chart that illustrates an example of an alternative ATM transaction process for embodiments of the invention.

FIG. 9 is a graphic flow chart that illustrates an example of an alternative ATM transaction process for embodiments of the invention. Referring to FIG. 9, at 901, the cardholder may enable the mobile application on the cardholder's mobile device and enter the cardholder's PIN code. At 902, the cardholder may stack his or her Touchcode-enabled or RFID-enabled card on top of his or her Touchcode-enabled or RFID/NFC-enabled mobile device, respectively, and place the mobile device at the NFC reader of an ATM. The cardholder's card and mobile device may be Touchcode-enabled using, for example, Printechnology Touchcode, which may provide a convenient, simple method for the mobile user while making all aspects of the transaction completely secure. Alternatively, the cardholder's mobile device may be RFID-enabled, for example, by a Micro Secure Digital (MicroSD) card, such as one supplied by Dallas-based Device-Fidelity, which may be inserted into the mobile device to transform the mobile device into a passive tag and an RFID reader, which can then be linked to the cardholder's bank account. It is to be understood however, such RFID-enablement is exemplary only and that embodiments of the invention include any and all RFID-enablement. The RFID may be read only with a range limited to 0.5 inch and may contain, for example, the cardholder's encrypted account number, the encryption key identifier, and the card issuer identifier.

Figure 10:
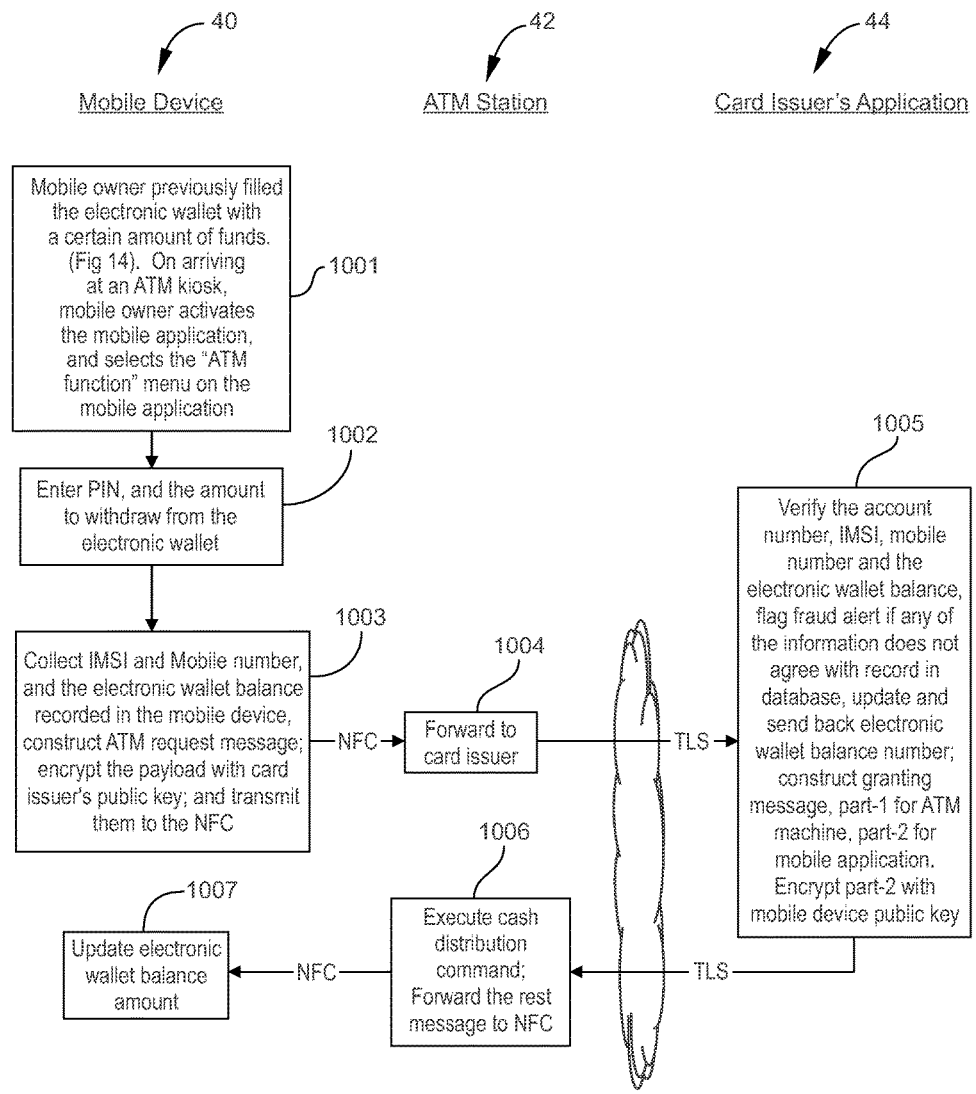
FIG. 10 is a schematic flow diagram that illustrates an example of the flow of information between components in an ATM transaction process for embodiments of the invention.

FIG. 10 is a schematic flow diagram that illustrates an example of the flow of information between components in an ATM transaction process for embodiments of the invention. Referring to FIG. 10, the components may include, for example, a mobile device 40 having a mobile device processor coupled to memory, an ATM station 42 having an ATM processor coupled to memory, and a card issuer's application 44 executing on a card issuer's processor coupled to memory. Referring also, to FIG. 10, at 1001, the card owner may activate the mobile application and select an ATM function, such as withdraw cash, from a menu displayed on the user's mobile device 40 by the mobile application. At 1002, the card owner may enter a PIN code on the mobile device 40 and may scan the QR code using the mobile device 40. At 1003, the mobile application may decrypt the QR code to obtain the card owner's account number, collect the IMSI number and phone number of the mobile device; construct an ATM transaction message consisting of the account number, the PIN code, the IMSI number and phone number of the mobile device 40, the ATM action, and a withdrawal amount; and encrypt a payload with the card issuer's public key.

Referring again to FIG. 10, at 1004 the mobile application may transmit the encrypted payload via an ATM station NFC channel of the ATM station 42 to the card issuer's application 44 using, for example, transport layer security (TLS). At 1005, the card issuer application 44 may verify the account number, the PIN code, the IMSI number and phone number of the mobile device 40; construct a two-part granting message with a first part for the ATM machine 42 consisting of instructions to the ATM machine 42 and a second part for the mobile application 40 such as account balance, past transactions, etc.; encrypt the second part of the message with the public key of the mobile application 40; and send the message to the ATM station 42 using TLS. At 1006, the ATM machine 42 may execute a cash distribution command per part one of the granting message and send part two of the granting message to the mobile device 40 via the NFC channel. At 1007, the mobile application 40 may process part two of the granting message.

Figure 11:
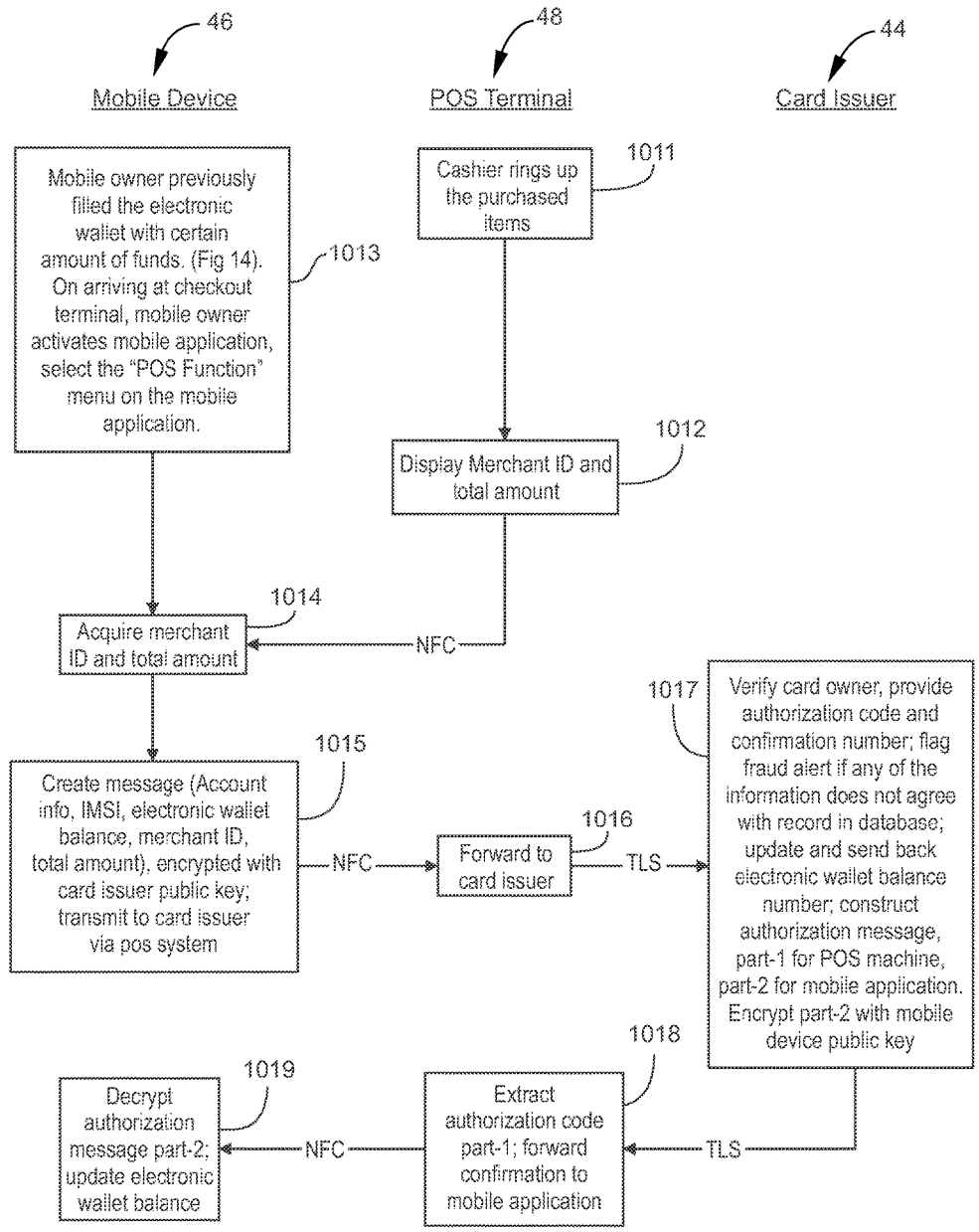
FIG. 11 is a schematic flow diagram that illustrates an example of the flow of information between components in a POS transaction using a credit card for embodiments of the invention.
Figure 14:
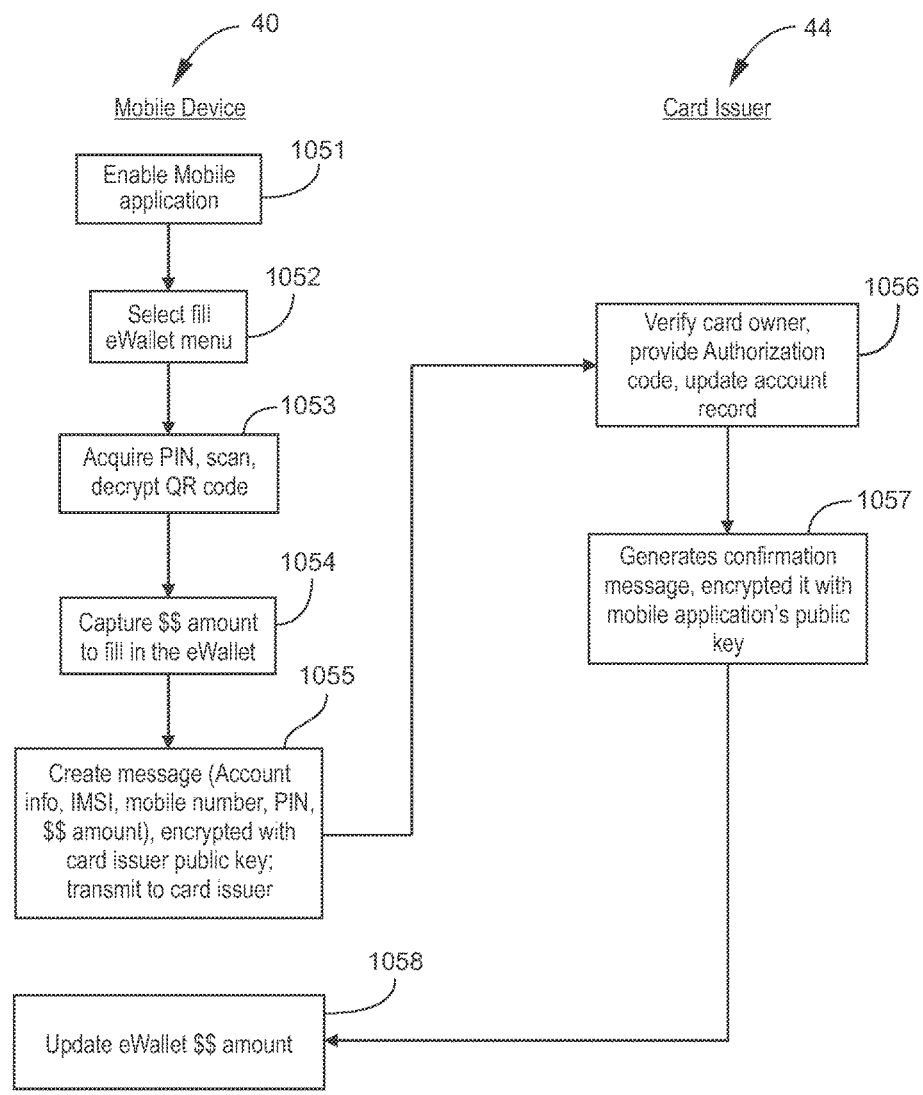
FIG. 14 is a schematic flow diagram that illustrates an example of the flow of information between components in the process of filling an electronic wallet for embodiments of the invention.

FIG. 11 is a schematic flow diagram that illustrates an example of the flow of information between components in a point-of-sale payment transaction using a credit card for embodiments of the invention. Referring to FIG. 11, the components may include, for example, an NFC-enabled mobile device 46 having a mobile device processor coupled to memory, an NFC-enabled POS terminal 48 having a POS processor coupled to memory, and a card issuer's application 44 executing on a card issuer's processor coupled to memory. Referring also to FIG. 11, at 1011, a cashier at the NFC-enabled POS terminal 48 may ring up all the purchased items for a cardholder. At 1012, the merchant's NFC-enabled POS device 48 may display the total amount and merchant ID. At 1013, the mobile owner may have previously filled his or her electronic wallet with a certain amount of funds. (FIG. 14). At 1014, the POS device 48 may send the merchant ID and total purchase amount to the mobile application on the card owner's mobile device 46.

Referring again to FIG. 11, at 1015, the mobile application may construct a payment request message consisting of the card account number, the electronic wallet PIN, the IMSI number and phone number for the mobile device 46, the merchant ID, and the total purchase amount; encrypt the payment request message with card issuer's public key; and send the encrypted payment message over the NFC port to the POS device 48. At 1016, the merchant's NFC-enabled POS device 48 may forward the encrypted payment request to the card issuer's application 44. At 1017, the card issuer's application 44 may receive and decrypt the message with its private key; verify the card owner, authorize payment; and generate an unencrypted authorization code to the merchant's POS device 48 and a confirmation number to the card owner's mobile device 46 encrypted with the public key of the mobile device 46. At 1018, the merchant's POS device 48 may extract the authorization code and forward the encrypted conformation number to the mobile application 46 via the NFC port of the POS device 48. At 1019, the mobile device 46 may decrypt the confirmation number and store a record of the transaction.

Figure 12:
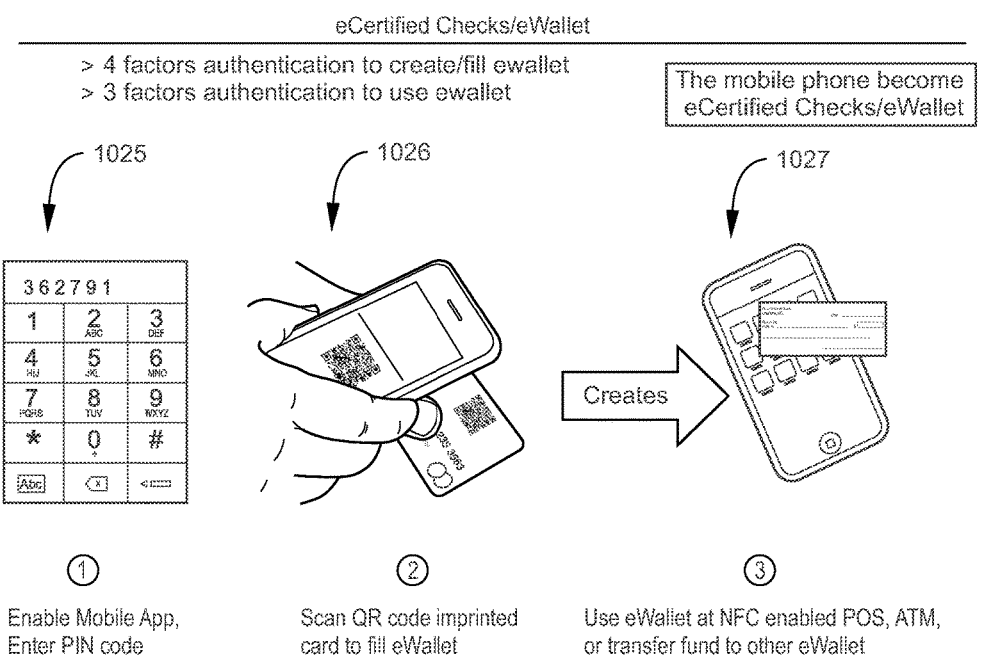
FIG. 12 is a graphic flow chart that illustrates an example of an electronic certified check and/or electronic wallets transaction process for embodiments of the invention.

FIG. 12 is a graphic flow chart that illustrates an example of an electronic certified check and/or electronic wallets transaction process for embodiments of the invention. Referring to FIG. 12, at 1025, the cardholder may enable the mobile application on the cardholder's mobile device and enter the cardholder's PIN code. At 1026, the cardholder may scan the QR code imprinted on his or her card with the cardholder's mobile device to fill the cardholder' electronic wallet. The QR code contains, for example, the cardholder's encrypted account number, the cardholder's encryption key identifier, and the card issuer's identifier. At 1027, the cardholder may place his or her NFC-enabled mobile device at an NFC reader of a POS terminal or ATM or may transfer funds to another wallet. The dollar amount may be held in the issuer's database. For a smart phone that is non NFC-enabled, the fund transfer function remains available. NFC enablement of the smart phone may allow POS and ATM transactions.

For each transaction, the issuer application assures that the funds have been allocated and that mobile application has a copy of the balance. In the foregoing example, the transaction may be authorized by the mobile device owner, who may be authenticated by attributes of his or her mobile device and PIN code. The card issuer may confirm every transaction and deduct the amount from the electronic wallet account in real time. The cardholder may refill his or her electronic wallet at any time or place, so long as the mobile device owner has his or her card on hand and online communication is available, which eliminates the dependency on the ATM. Other electronic wallet owners may phone in funds. Cash may be retrieved from the cardholder's electronic wallet account at an ATM without the need to have a card present at the ATM.

Figure 13:
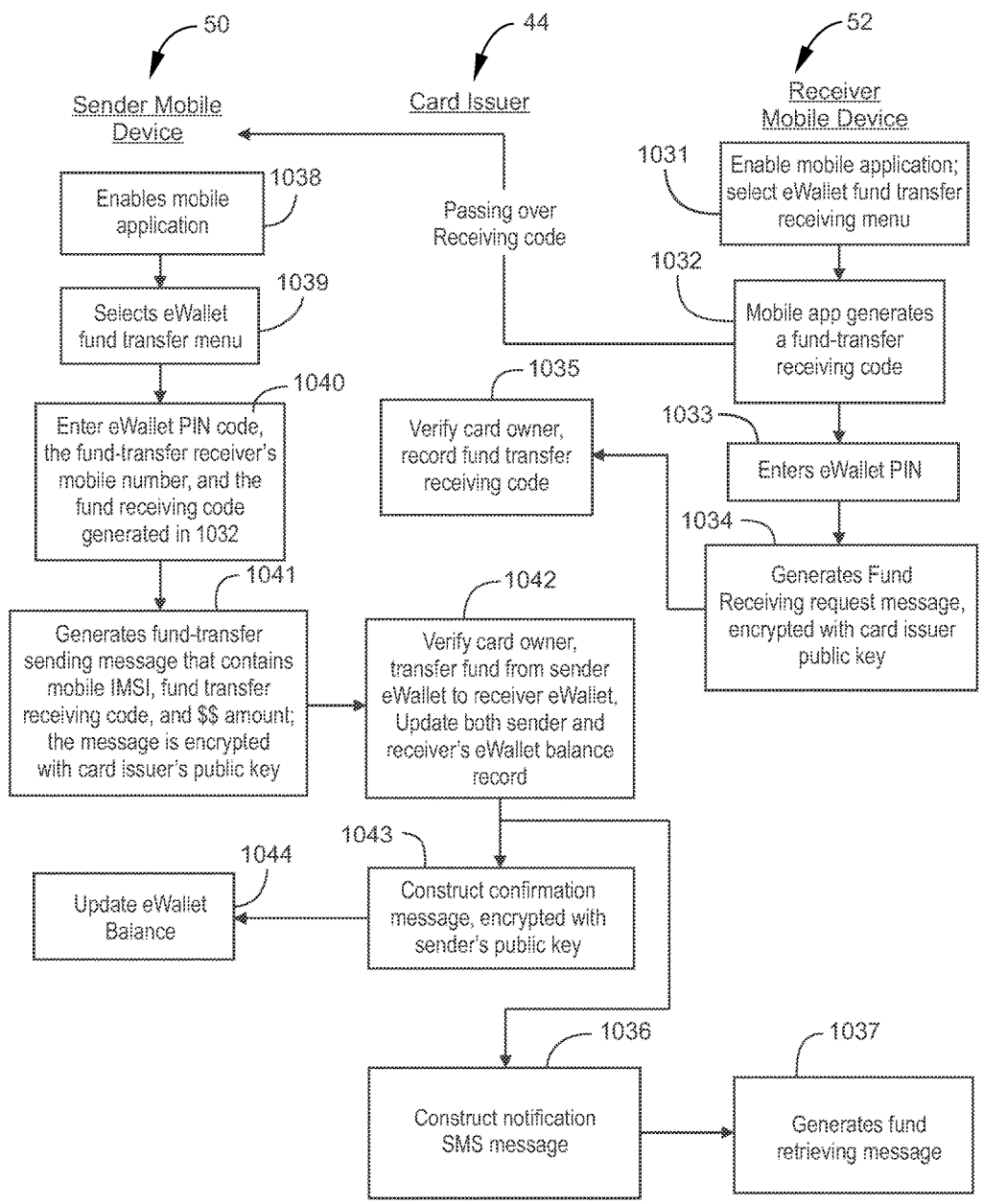
FIG. 13 is a schematic flow diagram that illustrates an example of the flow of information between components in the process of transferring funds between electronic wallets for embodiments of the invention.

FIG. 13 is a schematic flow diagram that illustrates an example of the flow of information between components in the process of transferring funds between electronic wallets for embodiments of the invention. Referring to FIG. 13, components may include, for example, a sender's mobile device 50 having a sender's mobile device processor coupled to memory, a card issuer's application 44 executing on a card issuer's processor coupled to memory, and a receiver's mobile device 52 having a receiver's mobile device processor coupled to memory. Referring also to FIG. 13, at 1031, the receiver owner may enable the mobile application on the receiver's mobile device 52. At 1032, the receiver may enter a selection for an electronic wallet fund transfer on the receiver's mobile device 52, whereupon the receiver's mobile device application may generate a fund transfer receiving code, and the receiver may provide the sender with the receiving code. At 1033, the receiver may enter an electronic wallet PIN on the receiver's mobile device 52.

Referring further to FIG. 13, at 1034, the receiver's mobile application 52 may generate a fund receiving request message consisting of a fund receiving code, the mobile device IMSI number and phone number, and an electronic wallet PIN; encrypt the message with the public key of the card issuer 44; and send the encrypted message to the card issuer 44. At 1035, the card issuer application 44 may verify the message accuracy and associate the fund transfer receiving code with an electronic wallet account. At 1036, the card issuer application 44 may generate and send a notification SMS message to the receiver mobile device 52. At 1037, the receiver application 52 may generate a fund retrieving message which contains the mobile device IMSI number and phone number, the electronic wallet PIN, and a fund receiving code. At 1038, the sender may enable the sender's mobile application on the sender's mobile device 50. At 1039, the sender may enter a selection for an electronic wallet fund transfer on the sender's mobile device 50. At 1040, the sender may enter the receiver's phone number and the fund transfer receiving code on the sender's mobile device 50.

Referring again to FIG. 13, at 1041, the sender's mobile application 50 may generate a fund transfer sending message consisting of the mobile device IMSI number and phone number, the electronic wallet PIN, the fund receiver phone number, the fund receiving code, and an amount to transfer; encrypt the message with card issuer's public key; and send the encrypted message to the card issuer 44. At 1042, the card issuer application 44 may verify the accuracy of the message and update the transfer amount to the electronic wallet accounts of both the sender and the receiver. At 1043, the card issuer application 44 may construct a fund transfer confirmation message consisting of the transfer amount deducted from the sender's electronic wallet account and the updated balance; encrypt the message with the sender's mobile application public key; and send the encrypted message to the mobile application on the sender's mobile device 50. At 1044, the mobile application on the sender's mobile device 50 may update the sender's electronic wallet balance.

FIG. 14 is a schematic flow diagram that illustrates an example of the flow of information between components in the process of filling an electronic wallet for embodiments of the invention. Referring to FIG. 14, components may include, for example, a user's mobile device 40 having a mobile device processor coupled to memory and a card issuer's application 44 executing on a card issuer's processor coupled to memory. Referring further to FIG. 14, at 1051, the mobile device owner may enable the mobile application on his or her mobile device 40. At 1052, the mobile device owner may enter a selection for an electronic wallet refill on his or her mobile device 40. At 1053, the mobile device owner may enter an electronic wallet PIN on the mobile device 40 and scan the QR code on the owner's card with the mobile device 40 to capture the card account number on the mobile device 40. At 1054, the mobile device owner may enter an amount to fill his or her electronic wallet on the mobile device 40.

Referring again to FIG. 14, at 1055, the mobile application 40 may construct an electronic wallet fill request consisting of the card account number, the electronic wallet PIN, the mobile device IMSI number and phone number, and the amount; encrypt the electronic wallet fill request message with the card issuer's public key; and send the encrypted message via a mobile network or Wifi channel to the card issuer 44. At 1056, the card issuer application 44 may verify the request information, check the owner's account balance, decrement the account by the requested amount, and update the electronic wallet account record. At 1057, the card issuer application 44 may generate a confirmation message consisting of the amount and a confirmation code; encrypt the confirmation message with the mobile application's public key- and send the encrypted message to the owner's mobile device 40. At 1058, the mobile application 40 may update the electronic wallet amount.

Figure 15:
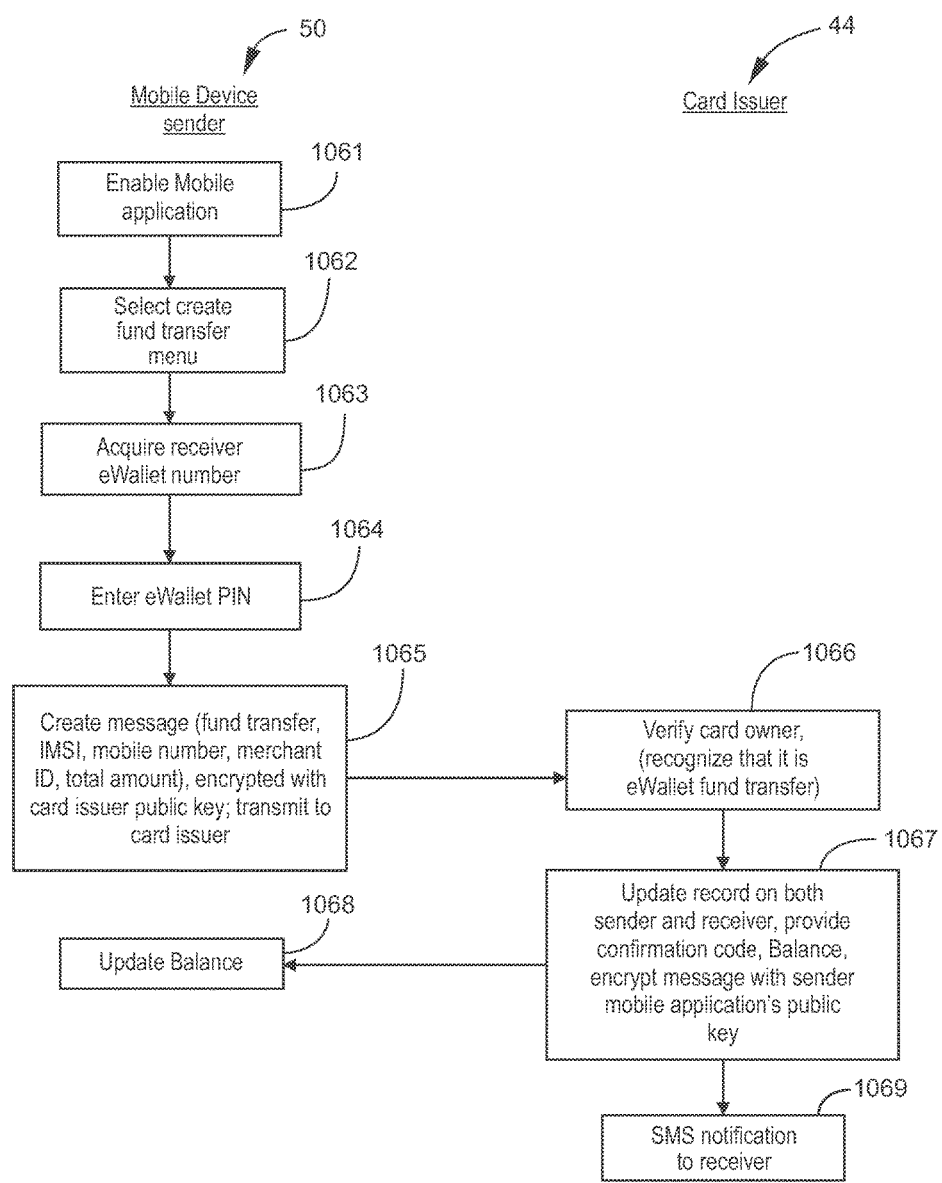
FIG. 15 is a schematic flow diagram that illustrates an example of the flow of information between components in an alternative process of transferring funds between electronic wallets for embodiments of the invention.

FIG. 15 is a schematic flow diagram that illustrates an example of the flow of information between components in alternative process of transferring funds between electronic wallets for embodiments of the invention. Referring to FIG. 15, components may include, for example, a sender's mobile device 50 having a sender's mobile device processor coupled to memory and a card issuer's application 44 executing on a card issuer's processor coupled to memory. Referring also to FIG. 15, at 1061, the owner of the sender mobile device may activate the mobile application 50. At 1062, the owner of the sender mobile device may select a create fund transfer option from a menu on the mobile device application 50. At 1063, the mobile application of the sender device 50 may acquire the electronic wallet PIN code for a receiver. At 1064, the owner of the sender mobile device 50 may enter the sender's electronic PIN code.

Referring further to FIG. 15, at 1065, the sender's mobile application 50 may create a message consisting of a fund transfer request, the IMSI number and phone number of the sender's mobile device 50, and a transfer amount; encrypt the message with the card issuer's public key; and send the encrypted message to the card issuer application 44. At 1066, the card issuer application 44 may receive the message; verify the card owner and recognize that the message is an electronic wallet fund transfer. At 1067, the card issuer application 44 may update the record for both the sender and the receiver provide a confirmation code and balance; and encrypt a message with the sender's mobile application public key. At 1068, the card issuer application 44 may send an update balance message to the sender's mobile device 50. At 1069, the card issuer application 44 may send an SMS notification message to the receiver's mobile device (not shown).

Figure 16:
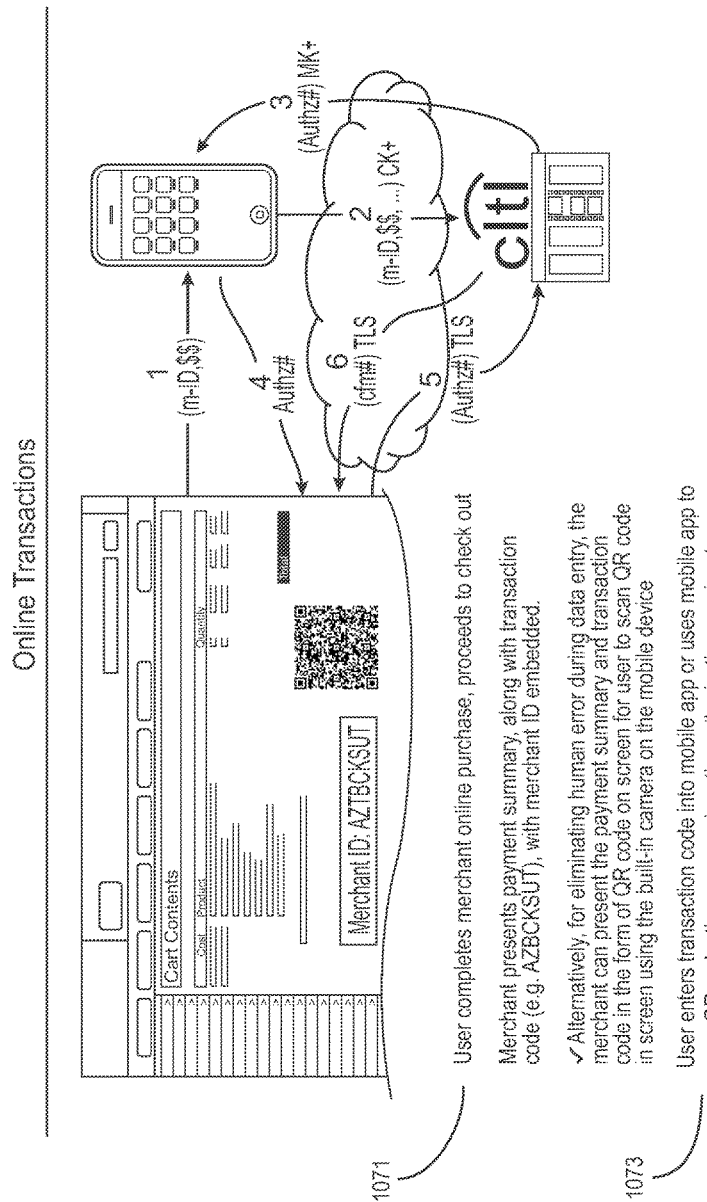
FIG. 16 is a graphic flow chart that illustrates an example of an online transaction for embodiments of the invention.

FIG. 16 is a graphic flow chart that illustrates an example of an online transaction for embodiments of the invention. Referring to FIG. 16, at 1071, after completing selections for an online purchase, a user may proceed to checkout. At 1072, the online merchant website may present a shopping cart payment summary along with a transaction code (e.g. AZBCKSUT) with the merchant ID and a dollar amount embedded in the transaction code. Alternatively, the online merchant may present the information in QR code, or simply a bar code, on the user's computer screen, and the user may scan the QR code on the screen with his or her mobile device. At 1073, the user may enter the transaction code into the mobile application on his or her mobile device or he or she may scan the QR code using the mobile application on his or her mobile device, and the transaction code may be sent to the card issuer's application for payment authorization. When the card issuer authorizes the transaction, the card issuer may send an authorization code to the mobile application in the form, for example, of a character string, a QR code, or a bar code. The user may manually enter the authorization code to a browser page that connects to the merchant site. Alternatively, if the user has a web cam, he or she may present the QR code or bar code displayed by the mobile application to the web cam.

Figure 17:
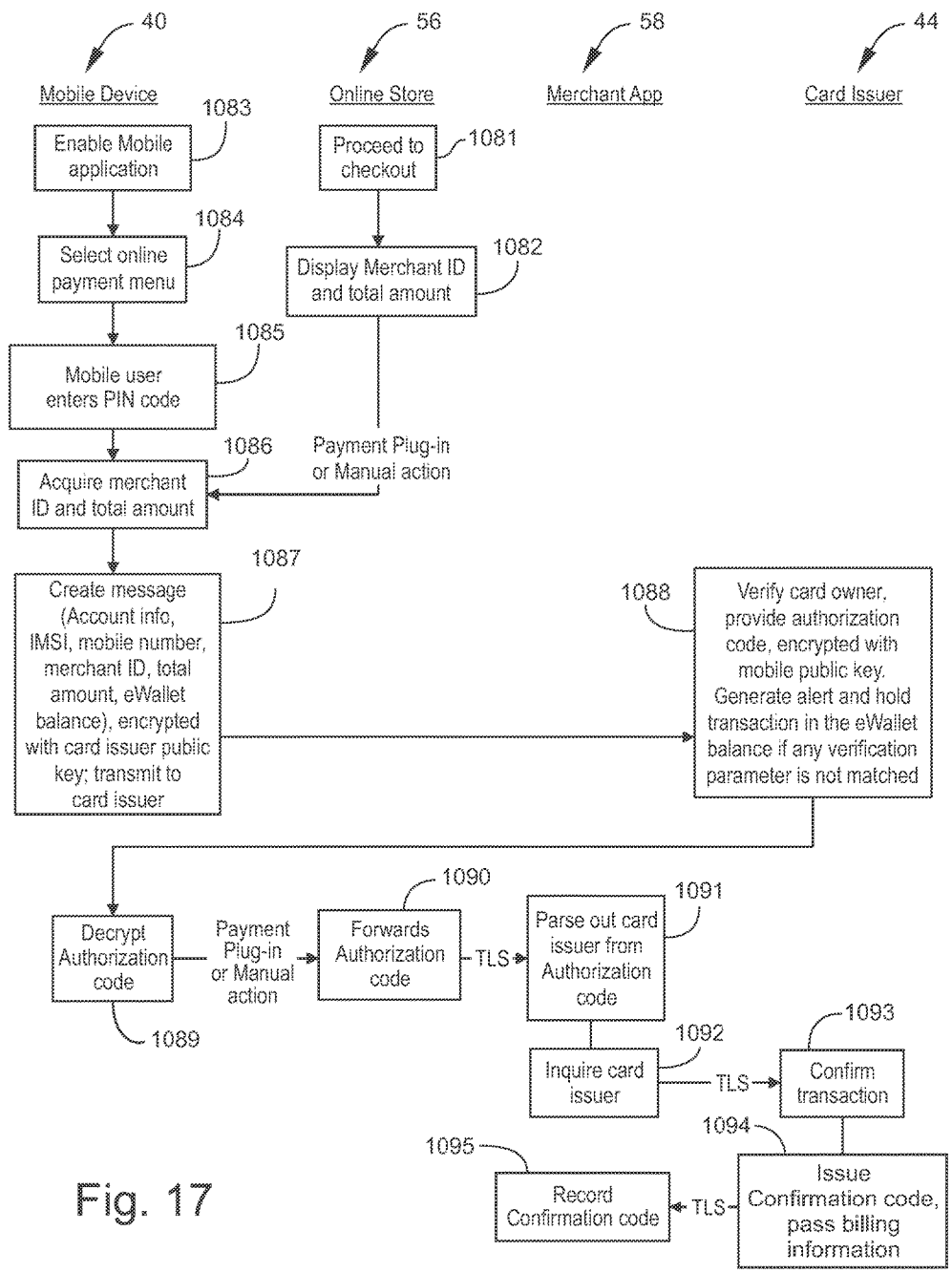
FIG. 17 is a schematic flow diagram that illustrates an example of the flow of information between components in an online payment transaction using a credit card for embodiments of the invention.

FIG. 17 is a schematic flow diagram that illustrates an example of the flow of information between components in an online payment transaction using a credit card for embodiments of the invention. Referring to FIG. 13, components may include, for example, a user's mobile device 40 having a mobile device processor coupled to memory, an online store 56 having an online store processor coupled to memory, a merchant application 58 executing on a merchant processor coupled to memory, and a card issuer 44 having a card issuer processor coupled to memory. Referring further to FIG. 17, at 1081, the card user may proceed to checkout without needing to enter billing information. At 1082, the merchant application 58 may display a total amount and a merchant ID, both in text format, and optionally in QR code or bar code format. At 1083, the card owner may enable the mobile application on the card owner's mobile device 40. At 1084, the card owner may select the online payment option from a menu displayed by the card owner's mobile application on the mobile device 40.

Referring again to FIG. 17, at 1085, the card owner may enter the card owner's PIN number on the mobile device 40 if paid by electronic wallet or optionally scan the QR code on the owner's card if paid by card. At 1086, the card owner may enter the merchant ID and total amount and optionally scan the QR code displayed on the user's computer screen using the mobile device 40. At 1087, the mobile application 40 may generate an online payment message consisting of account information if paid by card, the IMSI number and phone number of the owner's mobile device, the PIN code, the merchant ID, and the total amount; encrypt the message with the card issuer's public key; and send the encrypted message to the card issuer application 44. At 1088, the card issuer application 44 may verify that the information in the message is accurate; generate an authorization code consisting of a combination of the card issuer's ID and a transaction ID; encrypt the message with the mobile application's public key; and send the encrypted message to the mobile application 40.

Referring further to FIG. 17, at 1089, the mobile application 40 may decrypt and display the authorization code, which the card owner may enter on a merchant checkout dialog box displayed by the online store application 56. At 1090, the online store application 56 may pass the authorization code to the merchant application 58 using TLS. At 1091, the merchant application 58 may parse out the card issuer from the authorization code. At 1092, the merchant application 58 may send an inquiry message containing the transaction ID to the card issuer application 44 for confirmation using TLS. At 1093, the card issuer application 44 may verify the transaction from the transaction code. 1094, the card issuer application 44 may generate a confirmation of payment code and pass billing information to the merchant application 58. At 1095, the merchant application 58 may complete the transaction and record the confirmation code.

Figure 18:
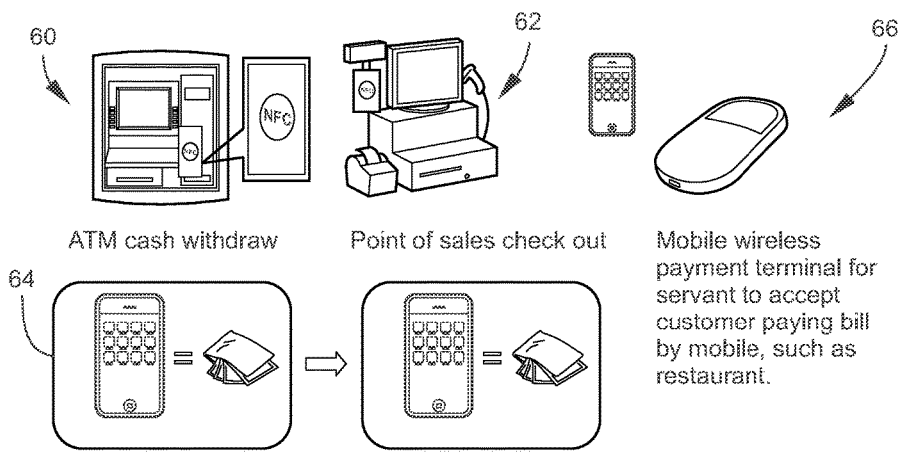
FIG. 18 illustrates examples of different use cases for embodiments of the invention.

FIG. 18 illustrates examples of different use cases for embodiments of the invention. Referring to FIG. 18, the platform and infrastructure for embodiments of the invention enable secure financial transaction including, without limitation, ATM cash withdrawal 60, point-of-sale checkout 62, mobile device-to-mobile device or mobile device-to-account fund transfer 64, and mobile wireless payment terminal 66 for a service provider to accept payment from a customer, for example, at a restaurant.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a Wide Area Network (WAN), a Local Area Network (LAN), a cellular network, or any other suitable network. Embodiments of the invention may employ client devices that may each comprise a computer-readable medium, including but not limited to, Random Access Memory (RAM) coupled to a processor. The processor may execute computer-executable program instructions stored in memory. Such processors may include, but are not limited to, a microprocessor, an Application Specific Integrated Circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a RAM. Such server devices, which may be a single computer system, may also be implemented as a network of computer processors. Examples of such server devices are servers, mainframe computers, networked computers, a processor-based device, and similar types of systems and devices.

What is claimed is:

1. A method of performing an electronic transaction using multifactor authentication, comprising:

providing a physical token imprinted with account information encoded in high-density code, the encoded account information imprinted on the physical token consisting at least in part of a secret account identifier encrypted with a unique shared symmetric encryption key stored separately on a mobile device processor and an authentication server processor and an unencrypted shared symmetric key identifier, and said secret account identifier being different from any unencrypted, unencoded account number printed on the physical token;

decoding, by the mobile device processor coupled to mobile device memory and executing a mobile application, the encoded account information imprinted on the physical token consisting at least in part of the secret account identifier encrypted with the unique shared symmetric encryption key stored on the mobile device processor and the authentication server processor and the unencrypted shared symmetric key identifier;

locating, by the mobile device processor, the unique shared symmetric encryption key using the unencrypted shared symmetric key identifier;

decrypting, by the mobile device processor, the secret account identifier encrypted with the unique shared symmetric encryption key using the located unique shared symmetric encryption key;

receiving, by the authentication server processor coupled to authentication server memory, from the mobile device processor, a transaction message encrypted with a public key of a first asymmetric public/private key pair, the private key of which is stored only on the authentication server processor, the encrypted transaction message consisting of the account identifier and a transaction request;

decrypting, by the authentication server processor, the transaction message consisting of the account identifier and the transaction request, with the private key of the asymmetric public/private key pair stored only on the authentication server processor;

verifying, using the authentication server processor, the account information;

encrypting, by the authentication server processor, a transaction confirmation message with a public key of a second asymmetric public/private key pair, the private key of which is stored only on the mobile device processor; and sending, by the authentication server processor, the transaction confirmation message encrypted with the public key of the second asymmetric public/private key pair, the private key of which is stored only on the mobile device processor to the mobile device processor.

2. The method of claim 1, wherein receiving the transaction message further comprises receiving a self-service financial transaction terminal transaction request message.

3. The method of claim 2, wherein receiving the self-service financial transaction terminal transaction request message further comprises receiving an automated teller machine withdrawal transaction request message.

4. The method of claim 1, wherein receiving the transaction message further comprises receiving a payment transaction request message.

5. The method of claim 4, wherein receiving the payment transaction request message further comprises receiving a merchant identifier and a payment amount for the payment transaction request.

6. The method of claim 4, wherein receiving the payment transaction message further comprises receiving an online payment transaction request message.

7. The method of claim 1, wherein receiving the transaction message further comprises receiving an electronic wallet fill request transaction message.

8. The method of claim 1, wherein receiving the transaction message further comprises receiving a fund transfer transaction request message.

9. The method of claim 8, wherein receiving the fund transfer transaction request message further comprises receiving a fund transfer amount for the fund transfer transaction.

10. The method of claim 8, wherein receiving the fund transfer transaction request message further comprises receiving a fund transfer receiver identifier for the fund transfer transaction.

11. The method of claim 1, wherein receiving the transaction message further comprises receiving the transaction message from the mobile application on the mobile device processor via a self-service financial transaction terminal.

12. The method of claim 1, wherein receiving the transaction message further comprises receiving the transaction message from the mobile application on the mobile device processor via a point-of-sale (POS) device.

13. The method of claim 1, wherein providing the physical token imprinted with account information encoded with high-density code further comprises providing the physical token imprinted with account information encoded with high-density, two-dimensional code.

14. The method of claim 1, wherein providing the physical token imprinted with account information encoded with high-density code further comprises providing the physical token imprinted with account information encoded with matrix bar code.

15. The method of claim 1, wherein providing the physical token imprinted with account information further providing the physical token imprinted with account information encoded on a transaction card of a user.

16. The method of claim 1, wherein receiving the transaction message further comprises receiving the transaction message consisting at least in part of a user identifier.

17. The method of claim 16 wherein receiving the transaction message consisting at least in part of the user identifier further comprises receiving the transaction message consisting at least in part of a user's personal identification number (PIN).

18. The method of claim 16, wherein receiving the transaction message consisting at least in part of the user identifier further comprises receiving the transaction message consisting at least in part of a user's electronic wallet personal identification number (PIN).

19. The method of claim 1, wherein receiving the transaction message further comprises receiving the transaction message consisting at least in part of a mobile device identifier.

20. The method of claim 19, wherein receiving the transaction message consisting at least in part of the mobile device identifier further comprises receiving the transaction message consisting at least in part of an International Mobile Subscriber Identity (IMSI) designation for the mobile device.

21. The method of claim 1, wherein receiving the transaction message further comprises receiving the transaction message encrypted by the mobile application with a public key of a card issuer.

22. The method of claim 21, further comprising decrypting, by the authentication server processor, the encrypted transaction message with the card issuer's private key of a public/private key pair of the card issuer.

23. The method of claim 1, wherein verifying the account information further comprises checking the account balance, decrementing the account by a transaction request amount, and updating an account record.

24. The method of claim 23, wherein updating a user's account record further comprises updating electronic wallet account records for both a user as a sender in a fund transfer transaction with a receiver and the receiver in the fund transfer transaction.

25. The method of claim 1, further comprising generating a two part transaction authorization message having a first part consisting at least in part of instructions to a self-service financial transaction terminal and a second part consisting at least in part of account balance information to the mobile application.

26. The method of claim 1, further comprising generating an authorization code to a merchant's point-of-sale (POS) device and a confirmation number to the mobile application.

27. The method of claim 1, further comprising generating a confirmation message consisting at least in part of a transaction amount and a confirmation code.

28. The method of claim 1, further comprising generating an authorization code consisting at least in part of a combination of a card issuer's identifier and a transaction identifier.

29. The method of claim 1, further comprising generating a transaction confirmation code and an account balance.

30. The method of claim 1, wherein sending the transaction confirmation message to the mobile application further comprises sending an at least partially encrypted transaction confirmation message to the mobile application.

31. A system for performing an electronic transaction using multifactor authentication, comprising:
   a physical token imprinted with account information encoded in high-density code, the encoded account information imprinted on the physical token consisting at least in part of a secret account identifier encrypted with a unique shared symmetric encryption key stored separately on a mobile device processor and an authentication server processor and an unencrypted shared symmetric key identifier, and said secret account identifier being different from any unencrypted, unencoded account number printed on the physical token;
   the mobile device processor coupled to mobile device memory and being programmed to:
      decode the encoded account information imprinted on the physical token consisting at least in part of the secret account identifier encrypted with the unique shared symmetric encryption key stored on the mobile device processor and the authentication server processor and the unencrypted shared symmetric key identifier;
      locate the unique shared symmetric encryption key using the unencrypted shared symmetric key identifier;
      decrypt the secret account identifier encrypted with the unique shared symmetric encryption key using the located unique shared symmetric encryption key;
   the authentication server processor coupled to authentication server memory and being programmed to:
      receive, from a mobile application executing on the mobile device processor, a transaction message encrypted with a public key of a first asymmetric public/private key pair, the private key of which is stored only on the authentication server processor, the encrypted transaction message consisting of the account identifier encrypted and a transaction request;
      decrypt the transaction message, consisting of the account identifier and the transaction request, with the private key of the asymmetric public/private key pair stored only on the authentication server processor;
      verify the account information;
      encrypt a transaction confirmation message with a public key of a second asymmetric public/private key pair, the private key of which is stored only on the mobile device processor; and
      send the transaction confirmation message encrypted with the public key of the second asymmetric public/private key pair, the private key of which is stored only on the mobile device processor to the mobile device processor.

* * * * *